(12) United States Patent
Meaney et al.

(10) Patent No.: US 9,195,374 B1
(45) Date of Patent: Nov. 24, 2015

(54) AUTOMATED STATISTICAL GRAPHING TOOL

(71) Applicant: Amazon Technologies, Inc., Reno, NV (US)

(72) Inventors: Michael Patrick Meaney, Dublin (IE); Derek Solomon Pai, Seattle, WA (US)

(73) Assignee: Amazon Technologies, Inc., Reno, NV (US)

(*) Notice: Subject to any disclaimer, the term of this patent is extended or adjusted under 35 U.S.C. 154(b) by 449 days.

(21) Appl. No.: 13/682,628

(22) Filed: Nov. 20, 2012

(51) Int. Cl.
*G06F 3/0484* (2013.01)
*H04L 12/26* (2006.01)

(52) U.S. Cl.
CPC .............. *G06F 3/0484* (2013.01); *H04L 43/16* (2013.01); *H04L 12/2602* (2013.01)

(58) Field of Classification Search
CPC .. H04L 43/16; H04L 12/2602; G05B 13/026; B22F 2998/00
See application file for complete search history.

(56) References Cited

U.S. PATENT DOCUMENTS

| | | | |
|---|---|---|---|
| 6,593,940 B1* | 7/2003 | Petersen et al. | 715/700 |
| 2008/0153589 A1* | 6/2008 | Baray et al. | 463/30 |
| 2012/0089724 A1* | 4/2012 | Liang et al. | 709/224 |

* cited by examiner

*Primary Examiner* — Ebrahim Golabbakhsh
(74) *Attorney, Agent, or Firm* — Kilpatrick Townsend & Stockton LLP

(57) ABSTRACT

Statistics of a distributed computing system are managed to identify and/or provide percentile data associated with the managed statistics. In some examples, percentiles associated with performance data of the computing system may be calculated. Based at least in part on a factor associated with the performance data, one or more of the calculated percentiles may be selected. Additionally, in some examples, graph data for at least a portion of the selected percentiles may be provided.

29 Claims, 8 Drawing Sheets

AUTOMATED STATISTICAL GRAPHING TOOL

BACKGROUND

Distributed computing systems as well as distributed computing services have become widely available in recent years. Such services and/or systems may, in some cases, be geographically and/or logically separate from one or more clients or users subscribing to the services. These services may include one or more computing devices configured to act as machine instances (e.g., virtual processors) and/or storage resources (e.g., virtual disk drives), for example. To analyze performance, monitors may be utilized at multiple points in the distributed system. The monitors may be configured to periodically and/or continuously monitor many operational metrics of the distributed system (e.g., processor utilization, web page latency, available storage, etc.). However, managing and/or analyzing such operational data may pose challenges to the service providers as well as the clients.

BRIEF DESCRIPTION OF THE DRAWINGS

Various embodiments in accordance with the present disclosure will be described with reference to the drawings, in which.

DETAILED DESCRIPTION

Figure 1:
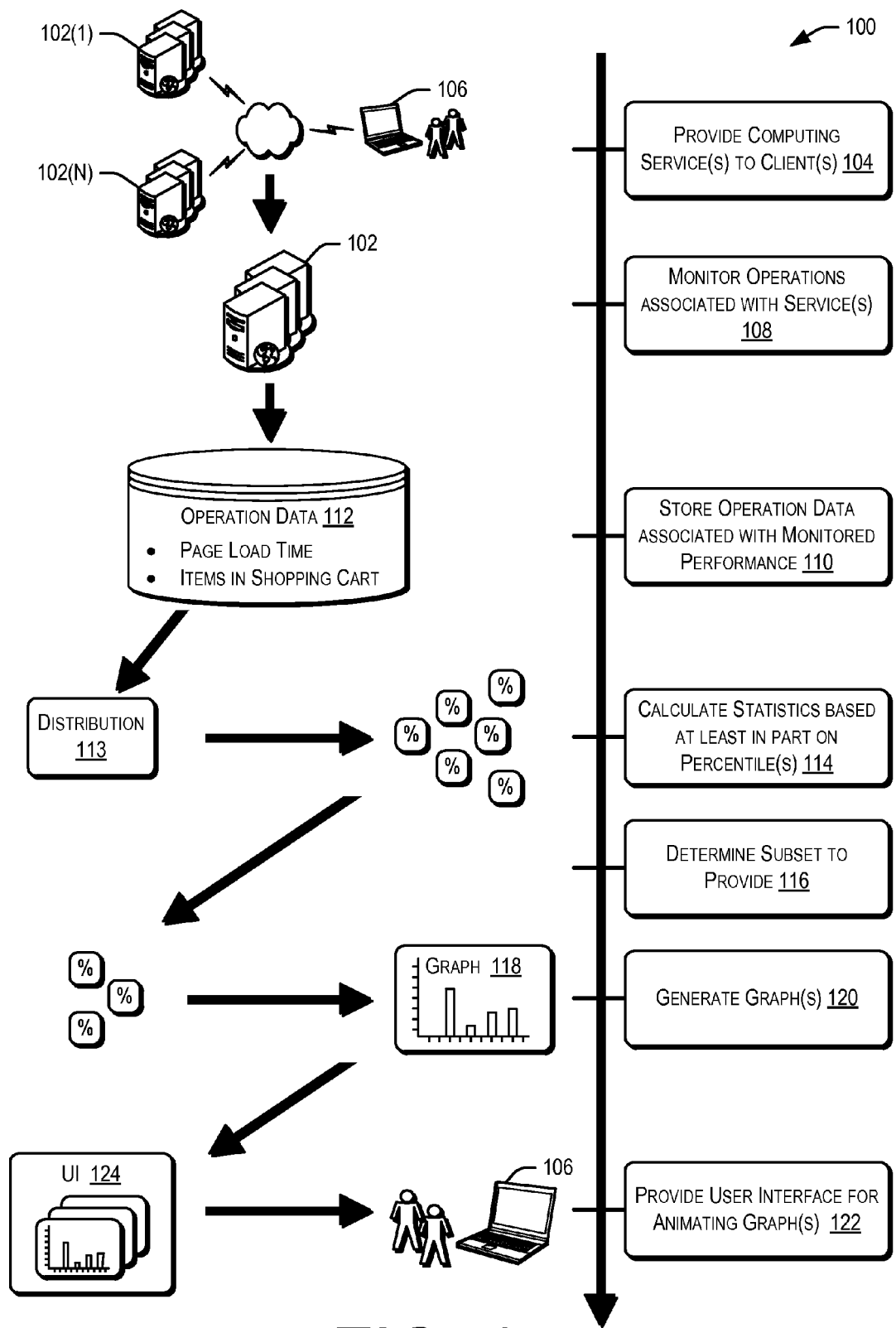
FIG. 1 illustrates an example flow for implementing automated statistical graphing tools, according to at least one example.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, managing resource operation metric data and/or statistics associated with operation and/or the performance of computing services and/or resources of a distributed environment. In some examples, web service users or, in general, clients may utilize or otherwise control a processing entity of the service provider to control, access, or otherwise manage other computing resources. As used herein, a processing entity may be a computing resource of the service provider and may include one or more computing devices, such as instantiated virtual machine instances, configured to access data of the distributed computing system (e.g., provided by the distributed system and acting on behalf of a client or user of the system). In some aspects, the service provider may also provide storage, access, and/or placement of one or more computing resources through a service such as, but not limited to, a web service, a cloud computing service, or other network based data management service. For example, a user or processing entity acting on behalf of the user may access, via the service provider, data storage services and/or data management services such that access mechanisms may be implemented and/or provided by the service provider to the processing entity utilizing the computing resources. In some examples, computing resource services, such as those provided by the service provider, may include one or more computing resources accessible across one or more networks through user interfaces (UIs), application programming interfaces (APIs), and/or other interfaces where the one or more computing resources may be scalable and/or expandable as desired In some examples, the computing resources may be server computer systems and/or data storage computer systems in a distributed computing environment, although other computing resources are considered as being within the scope of the present disclosure, some examples of which are provided below. Additionally, embodiments of the present disclosure may also be directed to, among other things, monitoring the operation and/or performance of the resources described herein and collecting or otherwise storing operational metric data associated with such performance. Once collected and/or stored, the data may be analyzed, utilizing one or more graphing techniques, and/or may be provided, rendered for display, and/or displayed to a user (i.e., the client). For example, for statistics based at least in part on percentile, "top N" data, graph or chart data may be calculated for the collected operational data. Further, in some examples, the percentiles or other statistical distributions may be graphed (i.e., rendered on a graph or in some other visual representation) and/or provided to the clients. In some examples, providing the visual representation of the data may provide enhanced analysis by the service provider and/or the client.

Additionally, in some examples, statistical information discovered within the percentiles may be utilized to determine which and/or how many percentiles (or how much percentile data) to provide. For example, operational issues may be identified within the percentile data (e.g., based at least in part on percentage differences between data points from a first percentile to a second percentile). These operational issues may then be utilized to identify which percentile graphs to provide. Further, in some examples, other statistical information (e.g., the sample size) may aid in determining which and/or how much statistical data to provide. For example, if the sample size of the data is 10, it may not make sense in some contexts to provide a user with a p99 percentile graph (or p99 percentile data).

As used herein, a percentile refers to a value of a variable below which a certain percent of data falls. For example, the $10^{th}$ percentile is the value below which 10 percent of the data can be found. Conversely, the $90^{th}$ percentile is the value below which 90 percent of the data can be located. As such, the $99^{th}$ percentile (or "p99" for short) is a value of the data above which 1% of the data within a particular distribution falls. For at least this reason, it may not, in certain contexts, be appropriate to provide a p99 percentile graph (or p99 percentile data) for a data set with only 10 data points, because no data point would accurately represent that point precisely. In other words, the p99 graph may not be accurate for such a small data set. As such, one factor in determining which and/or how many percentiles to provide may be the sample size. Other factors may include a large identified variance between two percentile data points, identified anomalies, known performance and/or operational issues, best practice metrics, or the like.

Additionally, in some examples, the percentiles that are selected may be provided in an animated fashion to a user via a user interface. For example, percentile graphs may be displayed consecutively in such a way that a user may be able to see changes from one percentile to the next. In this way, a larger amount of change between two percentile graphs, as viewed via the UI, may indicate anomalous data or some operational issues that are affecting a certain group of users or a particular computing resource. Further, in some aspects, recommendations may be provided to the users (e.g., via the UI) for fixing or otherwise remediating performance and/or operational issues that may be identified by calculating, comparing, animating, providing, and/or rendering the percentile graphs. Graph animations may also be provided based at least in part on settings and/or configurations of users. In other words, a user may determine or otherwise configure how the animations are to be presented. Further, notifications (e.g., emails, texts, or the like) may be provided (sometimes automatically) to users in order to notify them of anomalous data and/or potential operational issues identified by the percentile graphs. In some examples, the notifications may include one or more percentile graphs and/or animations of percentile graphs.

Additionally, in some aspects, a customer, user, and/or client may access a processing entity of a distributed system for attaching data sets, data volumes, data blocks, or the like to the processing entity for accessing, manipulating, and/or processing the data by the processing entity. That is, a processing entity may request that particular data volumes be operationally attached to the processing entity. In some aspects, operationally attaching a data volume may include generating, storing, maintaining, and/or updating a mapping of data stored in the data volume such that the processing entity may perform input and/or output (I/O) operations on the data. For example, data may be read from the attached data volume and/or written to the attached data volume by the processing entity. According to some examples, data volumes that are attached may be stored in a relatively low latency type of memory such that the I/O operations performed on the data may be performed in a faster (i.e., lower latency) fashion. In some examples, operational data may be collected and/or stored based at least in part on any of the aforementioned operations.

Further, in some examples, the service provider may serve web page information associated with a web page identifier (e.g., a uniform resource locator (URL)). Accordingly, operational data associated with such web services may also be collected. In other words, a monitor or other device may be configured to receive performance information (e.g., page load time, a number of page requests, latency, etc.) associated with such web services. Similarly, any operational metric associated with any computing resource or service provided by the service provider may be collected and/or stored, and further utilized to calculate and/or provide percentile data and/or percentile graphs.

Additionally, in some aspects, charts (e.g., pie charts, histograms, bar charts, line charts, etc.) or other data structures (trees, graphs, etc.) may be provided to represent different views of the collected statistics and/or percentile information. For example, a histogram or line chart depicting page load latency for a particular user may be provided. Further, in some examples, data for a multitude of single users may be combined to form a larger data set including multiple data points for a single interval (e.g., each interval may be represented by a tick on a chart along a single axis). Once combined, a percentile may be calculated for each interval. In one non-limiting example, once a percentile is calculated for each interval, percentile graphs (i.e., line charts or histograms) may be generated to depict data (for each interval) at particular percentages of the total data set. That is, a percentile graph may depict measured latency data at each interval within a particular period of time for a certain percentage of users. For example, the p90 latency graph for a web page may depict latency data associated with the top 10% recorded latencies at each interval for that web page.

FIG. 1 depicts an illustrative flow 100 in which techniques for the management of operational data associated with computing resources may be implemented. These techniques are described in more detail below in connection with at least FIGS. 2-7. Returning to FIG. 1, in illustrative flow 100, operations may be performed by one or more processors of one or more service provider computers 102 and/or instructions for performing the operations may be stored in one or more memories of the service provider computers 102. As desired, the flow 100 may begin at 104, where computing services and/or resources may be provided by other service provider computers 102(1)-(N) to client devices and/or associated client(s) 106. In one non-limiting example, the client devices 106 may be any type of user device such as, but not limited to, mobile devices, desktop computers, notebook computers, electronic book readers, tablet computing devices, etc. By way of example only, the service provider computers 102 or a monitor (e.g., a monitoring module) of the service provider computers 102 may monitor operations associated with the provided services and/or resources at 108. In other words, the service provider computers 102 may monitor web page requests, data transmission, data storage and retrieval, machine instance operations, etc., at 108.

In some examples, at 110, the service provider computers 102 may store operational data associated with the monitored operations in a data store such as, but not limited to, the operation data store 112. In some examples, such operational data may include, but are not limited to, page load times, page request latency, a number of items in an electronic shopping cart, a number of items downloaded, purchased or otherwise consumed, a number of users accessing a resource, and/or other appropriate operational data. Additionally, in some examples, one or more statistics (e.g., a percentile or the like) may be calculated for a distribution 113 of the operational data in the operation data store 112, at 114. In this way, different percentiles may be analyzed, compared, graphed, etc., to allow for identifying anomalies and/or operational issues. In some examples, every possible percentile out to a particular decimal point (e.g., 0.01, 0.001, etc.) or other specified accuracy may be calculated. However, in other examples, only a particular set of percentiles may be calculated at 114 (e.g., based at least in part on the sample size and/or a user or administrator's configuration). At 116, the service provider computers 102 may determine a subset of the calculated percentiles to provide. For example, and as noted above, the determination may be based at least in part on data identified in the calculated percentiles and/or comparisons between percentile data. In some aspects, percentile graphs, charts, or other statistical representations 118 may be generated at 120. That is, each percentile of the percentiles selected at 116 may be represented in graphical form. Finally, at 122, the service provider computers 102 may provide a UI 124 configured to animate the graphs generated at 120. In this way, the UI 124 may be provided to the user(s) and/or client(s) for viewing the generated graphs (or other representations) 118 on the client devices 106 of the users.

Figure 2:
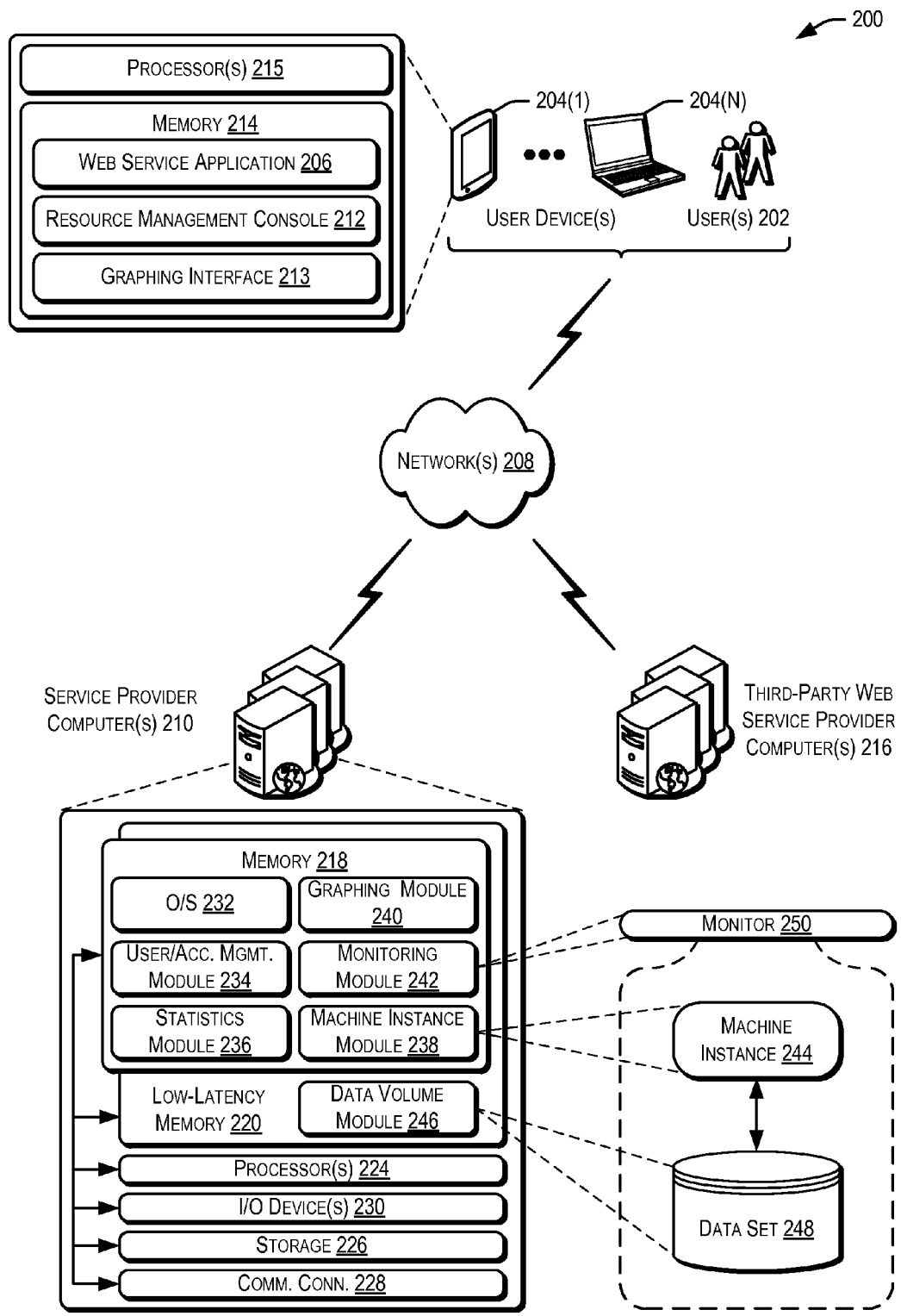
FIG. 2 illustrates an example architecture for implementing the automated statistical graphing tools described herein that includes a service provider computer, one or more user devices, and/or one or more third-party computing devices connected via one or more networks, according to at least one example.

FIG. 2 depicts an illustrative system or architecture 200 in which techniques for managing distributed computing statistics may be implemented. In architecture 200, one or more customers and/or users 202 (i.e., account holders) may utilize user computing devices 204(1)-(N) (collectively, "user devices 204") to access a web service application 206, or a user account accessible through the web service application 206, via one or more networks 208. In some aspects, the web service application 206 and/or user account may be hosted, managed, and/or otherwise provided by a computing resources service or service provider, such as by utilizing one or more service provider computers 210. In some examples, a customer may own, manage, operate, control, or otherwise be responsible (e.g., financially) for one or more accounts, groups of accounts, and/or sub-groups of accounts. The one or more service provider computers 210 may, in some examples, provide computing resources such as, but not limited, web hosting, client entities, data storage, data access, management, virtualization, etc. In some aspects, a processing entity may be virtual and/or data volumes may be stored virtually within a distributed computing system operated by the one or more service provider computers 210. The one or more service provider computers 210 may also be operable to provide web hosting, computer application development, and/or implementation platforms, combinations of the foregoing, or the like to the one or more users 202.

In some examples, the networks 208 may include any one or a combination of many different types of networks, such as cable networks, the Internet, wireless networks, cellular networks, and other private and/or public networks. While the illustrated example represents the users 202 accessing the web service application 206 over the networks 208, the described techniques may equally apply in instances where the users 202 interact with a service provider computer 210 via the one or more user devices 204 over a landline phone, via a kiosk, or in any other manner. It is also noted that the described techniques may apply in other client/server arrangements (e.g., set-top boxes, etc.), as well as in non-client/server arrangements (e.g., locally stored applications, etc.).

As described briefly above, the web service application 206 may allow the users 202 to interact with a service provider computer 210, such as to store, access, and/or manage data, develop and/or deploy computer applications, and/or host web content. The one or more service provider computers 210, perhaps arranged in a cluster of servers or as a server farm, may host the web service application 206. Other server architectures may also be used to host the web service application 206. The web service application 206 may be capable of handling requests from many users 202 and serving, in response, various user interfaces that can be rendered at the user devices 204 such as, but not limited to the resource management console 212 and/or the graphing interface 213. The web service application 206 can be any type of website that supports user interaction, including social networking sites, online retailers, informational sites, blog sites, search engine sites, news and entertainment sites, and so forth. As discussed above, the described techniques can similarly be implemented outside of the web service application 206, such as with other applications running on the user devices 204.

As noted above, the architecture 200 may include one or more user devices 204. The user devices 204 may be any type of computing device such as, but not limited to, a mobile phone, a smart phone, a personal digital assistant (PDA), a laptop computer, a desktop computer, a thin-client device, a tablet PC, etc. In some examples, the user devices 204 may be in communication with the service provider computers 210 via the networks 208, or via other network connections.

In one illustrative configuration, the user devices 204 may include at least one memory 214 and one or more processing units (or processor(s)) 215. The processor(s) 215 may be implemented as appropriate in hardware, computer-executable instructions, firmware, or combinations thereof. Computer-executable instruction or firmware implementations of the processor(s) 215 may include computer-executable or machine-executable instructions written in any suitable programming language to perform the various functions described.

The memory 214 may store program instructions that are loadable and executable on the processor(s) 215, as well as data generated during the execution of these programs. Depending on the configuration and type of user device 204, the memory 214 may be volatile (such as random access memory (RAM)) and/or non-volatile (such as read-only memory (ROM), flash memory, etc.). The user device 204 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 214 may include multiple different types of memory, such as static random access memory (SRAM), dynamic random access memory (DRAM), or ROM.

Turning to the contents of the memory 214 in more detail, the memory 214 may include an operating system and one or more application programs or services for implementing the features disclosed herein including at least the resource management console 212 or the graphing interface 213, such as web browsers or dedicated applications (e.g., smart phone applications, tablet applications, etc.), and/or the web service application 206. The resource management console 212 may be configured to receive, store, and/or display a website or other interface for interacting with the service provider computers 210. All, part, or none of the graphing interface 213 may be viewable and/or integrated within the resource management console 212. Additionally, the memory 214 may store access credentials and/or other user information such as, but not limited to, user IDs, passwords, and/or other user information. In some examples, the user information may include information for authenticating an account access request such as, but not limited to, a device ID, a cookie, an IP address, a location, or the like. In addition, the user information may include a user-provided response to a security question or a geographic location obtained by the user device 204.

Additionally, in some aspects, the resource management console 212 may allow a user 202 to interact with a web services account of the service provider computers 210. For example, the user 202 may request that computing resources be allocated to instantiate a processing entity on behalf of the user 202. Further, the client instance may then be physically or virtually attached to one or more data stores via interaction between the user 202 and the resource management console 212. The resource management console 212 may also be configured to receive, organize, store, and/or manage account settings and/or preferences. For example, configuration settings associated with how many instances to utilize, what network ports to open, whether to purchase reserved instances, locations and/or zones in which data should be stored, user-preferred security settings, etc., may be received from, stored on behalf of, and/or managed on behalf of the user and/or account via the resource management console 212.

In some aspects, the graphing interface 213 may be configured to provide a UI particularly designed for displaying percentile graphs as described above. Additionally, in some examples, the graphing interface 213 may be configured to receive requests for percentile graphs and/or user settings associated the requested percentile graphs. For example, the users 202 may configure the graphing interface 213 to request a certain number of percentile graphs for each type of metric being monitored and/or particular amounts of time to display each percentile graph during each animation. Other animation settings may be set. Further, the graphing interface 213 may be configured to generate the percentile graphs for the service provider computers 210. In this way, the service provider computers 210 may provide percentile graph data to the user devices 204 (e.g., upon request from the users 202) and the graphing interface 213 may generate the percentile graphs based at least in part on the received data (as opposed to receiving the graphs themselves).

Further, in some examples, the graphing interface 213 may display or otherwise provide resource advice provided by the service provider computers 210 for optimizing the user devices 204, the resources controlled by the service provider 210 (or other service provider) on behalf of the user 202, some other service, and/or some other devices or applications, such as the third party web service provider computers 216 or an application running on any one of the above mentioned computing devices.

In some examples, the service provider computers 210 may also be any type of computing devices such as, but not limited to, mobile, desktop, thin-client, and/or cloud computing devices, such as servers. In some examples, the service provider computers 210 may be in communication with the user devices 204 and/or the third-party service provider computers 216 via the networks 208, or via other network connections. The service provider computers 210 may include one or more servers, perhaps arranged in a cluster, as a server farm, or as individual servers not associated with one another. These servers may be configured to host a website (or combination of websites) viewable via the user devices 204 or a web browser accessible by a user 202. Additionally, in some aspects, the service provider computers 210 may be configured to perform operational statistics management and/or an automated percentile graphing tool as part of an integrated, distributed computing environment.

In one illustrative configuration, the service provider computers 210 may include at least one memory 218, at least one low-latency memory 220, and one or more processing units (or processor(s)) 224. The processor(s) 224 may be implemented as appropriate in hardware, computer-executable instructions, firmware, or combinations thereof. Computer-executable instruction or firmware implementations of the processor(s) 224 may include computer-executable or machine-executable instructions written in any suitable programming language to perform the various functions described.

The memory 218 may store program instructions that are loadable and executable on the processor(s) 224, as well as data generated during the execution of these programs. Depending on the configuration and type of service provider computers 210, the memory 218 may be volatile (such as random access memory (RAM)) and/or non-volatile (such as read-only memory (ROM), flash memory, etc.). The service provider computers 210 or servers may also include additional storage 226, which may include removable storage and/or non-removable storage. The additional storage 226 may include, but is not limited to, magnetic storage, optical disks, and/or tape storage. The disk drives and their associated computer-readable media may provide non-volatile storage of computer-readable instructions, data structures, program modules, and other data for the computing devices. In some implementations, the memory 218 may include multiple different types of memory, such as static random access memory (SRAM), dynamic random access memory (DRAM), or ROM.

The memory 218, the additional storage 226, both removable and non-removable, are all examples of computer-readable storage media. For example, computer-readable storage media may include volatile or non-volatile, removable or non-removable media implemented in any method or technology for storage of information such as computer-readable instructions, data structures, program modules, or other data. The memory 218 and the additional storage 226 are all examples of computer storage media. Additionally, the memory 218, the low-latency memory 220, and other envisioned memory devices of the service provider computers 210 are intended to cover systems where the different memory devices may be distributed among multiple host computing systems. For example, the memory 218 may be implemented by a first host device of the service provider computers 210 (e.g., service provider computer 210(1)), the low-latency memory 220 may be implemented by a second (and different) host device of the service provider computers 210 (e.g., service provider computers 210(2)). Additionally, other memory devices may be implemented by other different host devices. Further, one or more different modules and/or sets of modules may be implemented by different hosts, in some examples, even located in different locations and/or on different racks. For example, one or more application programs or services implemented by the service provider computers 210 may each be implemented by different host computing devices, or the like.

The service provider computers 210 may also contain communications connection(s) 228 that allow the service provider computers 210 to communicate with a stored database, another computing device or server, user terminals, and/or other devices on the networks 208. The service provider computers 210 may also include input/output (I/O) device(s) 230, such as a keyboard, a mouse, a pen, a voice input device, a touch input device, a display, speakers, a printer, etc.

Turning to the contents of the memory 218 in more detail, the memory 218 may include an operating system 232 and the one or more application programs or services for implementing the features disclosed herein including a user application/account management module 234, a statistical calculation module 236, a machine instance module 238, a graphing module 240, and/or a monitoring module 242. The user application/account management module 234 may be configured to generate, host, or otherwise provide the resource management console 212, and/or a website for accessing the resource management console 212 (e.g., the web service application 206), to users 202. In some examples, the user application/account management module 234 may also be configured to maintain, or otherwise store, account information associated with requested resources, data, and/or services. The account information may include account holder information, the user ID, the password, acceptable answers to challenge questions, etc. Additionally, as noted above, each of the aforementioned modules 232, 234, 236, 238, 240, 242, 246 may be implemented or otherwise provided by different host computing devices of the service provider computers 210. For example, while the machine instance module 238 and the graphing module 240 are illustrated in FIG. 2 as being stored within the memory 218 and, potentially hosted by a single computing device, it will be understood that these modules 238, 240 (and/or any of the other modules in the memory 218) may be stored or implemented by one or more different hosts devices of the service provider computers 210 (e.g., in a distributed environment).

In some aspects, the machine instance module 238 may be configured to operate as a hypervisor or other virtualization system. For example, the machine instance module 238 may create, generate, instantiate, or otherwise provide one or more machine instances 244 (i.e., a processing entity of the distributed system) to a user 202 by providing one or more guest operating systems that may operate on behalf of the user 202. That is, in some examples, a user 202 may operate a machine instance 244 as if the operations were being performed by one or more processors, such as the processors 215 of the user device 204. As such, the machine instance 244 may be considered a processing entity acting on behalf of user 202 and/or accessing data, data sets, data volumes, data blocks, etc., of the one or more service provider computers 210.

Additionally, in some examples, the one or more service provider computers 210 may include a low-latency memory 220. The low-latency memory 220 may include one or more application programs or services for implementing the features disclosed herein including a data volume module 246. In some examples, as shown in FIG. 1, the data volume module 246 may be configured to implement, host, or otherwise manage data stored in a data set 248. As noted above, in some aspects, a user 202 may make requests for attaching and/or detaching data storage devices (which may be virtual) associated with data sets 248 from one or more machine instances 244 (i.e., processing entities) and/or for backing up data of the attached data volumes. For example, a user may be an application programmer testing code using a machine instance 244 and an attached data set 248 of the service provider computers 210. In this non-limiting example, while the code is being tested, the user 202 may have the data set 248 attached to the machine instance 244 and may request that one or more I/O operations be performed on the attached data set 248. During and/or after testing of the code, the user 202 may make one or more backup requests of the attached data set 248. However, in some examples, once the testing is complete, the user 202 may request that the attached data set 248 be detached from the machine instance 244. Further, other operations and/or configurations utilizing the machine instance 244 and/or the data set 248 may be envisioned, as desired, for implementing a web service on behalf of a user 202. Additionally, in other examples, the machine instance may act as a web server configured to serve web content (e.g., web pages, data stored in the data set 248 or elsewhere) on behalf of a user 202 or on behalf of the service provider computers 210.

Returning to the contents of the memory 218 in more detail, the service provider computers 210 may execute a user application/account management module 234. In some examples, the user application/account management module 234 may be configured to generate, host, or otherwise provide the graphing interface 213, and/or a website for accessing the graphing interface 213 (e.g., the web service application 206), to users 202. In some aspects, the service provider computers 210 may also execute a monitoring module 242 which may be configured to host or otherwise provide a monitor 250 for monitoring, collecting, or otherwise receiving, operational information associated with one or more resources of a computing service or device. Further, the monitor 250 may also be configured to aggregate operational information associated with one or more related or unrelated accounts. In one non-limiting instance (e.g., as shown in FIG. 1), the monitor 250 may receive API calls placed by the machine instance 244 or may scrape the data set 248 for data usage information. In other examples, the monitor 250 may receive API calls placed by other entities on other resources and/or may determine configuration information associated with the resources by querying one or more configuration files of the service provider computers 210 that are associated with the one or more users 202 and/or accounts of users 202. Additionally, the monitor 250 may be configured to receive or otherwise collect operational information for computing resources other than the machine instance 244 and data set 248. For example, the monitor 250 may receive operational information associated with a web site or other computing resource including, but not limited to, services and/or resources provided by the third-party service provider computers 216. For example, while the monitor may not be able to actively monitor resources of a third-party computing system, the monitor 250 may be configured to receive operational information from such third-party systems.

The statistical calculation module 236 may, in some examples, be configured to calculate statistical data for the monitored, received, and/or stored operational metrics associated with the monitored computing resources and/or services. The statistical data may be based at least in part on percentiles, "top N," overstats, etc. Additionally, in some examples, the statistical calculation module 236 may calculate other statistically relevant information associated with the collected data including, but not limited to, an average, a mean, a maximum, a minimum, a "top N," and/or a "bottom N." Top N may refer to a calculation of a top number of values for a data set, while Bottom N may refer to a bottom number of values of a data set. For example, "top 1" may indicate a calculation of the largest number in a data set, which may also correspond to the maximum, while "top 2" may indicate a calculation of the two largest numbers in the data set.

In some examples, the graphing module 240 may be configured to generate percentile graphs based at least in part on the calculated percentiles. However, the graphing module 240 may also be configured to generate other types of visual representations (e.g., pie charts, line charts, histograms, tree-type data structures, etc.) for distributions of data other than percentiles. For example, the graphing module 240 may be configured to generate a histogram of averages for a data set or the like, as desired. Further, in some examples, the graphing module 240 may generate graphing data as opposed to the graphs (or charts) themselves. In other words, the graphing module 240 may provide charts and/or it may provide graphing data that may be configured in such a way that another computing device (e.g., the user devices 204) may easily or programmatically convert the graphing data into a visual representation (i.e., a graph or chart of its choice, based at least in part on a configuration setting or a selection by the user 202).

The third-party web service provider computers 216 may be any type of computing system as well. In some examples, the third-party web service provider computers 216 provide web services and/or other computing resources to users 202 that are similar to the services and/or resources that may be provided by the service provider computers 210. For example, the third-party computers 216 may configured as web servers, cloud storage devices, or the like. In some examples, the user application/account management module 234, described above, may also be configured to provide general and/or specific operational metrics to users 202. For example, a user 202 that subscribes or other utilizes the service provider computers 210 to implement one or more machine instances 244 and/or attachable data sets 248 may be automatically registered to receive operational metrics (e.g., percentiles, top N data, graphs, charts, etc.) associated with such resources from the user application/account management module 234. Additionally, a user 202 may register an account, service, and/or resource provided by the third-party web service provider computers 216 with the user application/account management module 234. In this way, the user application/account management module 234 may provide similar metrics (e.g., percentile charts, etc.) associated with the third-party computers 216 to the users.

Additionally, in some aspects, users of the third-party service provider computers 216 may be able to access statistical information collected, analyzed, and/or generated by the service provider computers 210 by utilizing one or more APIs. For example, a user of any third-party service may have their operational data (i.e., operational data associated with operation of the third-party service) provided to the service provider computers 210. Statistics, percentiles, etc., may be calculated for this operational data and/or percentile graph data may be generated. In some examples, these third-party users may then utilize API calls to access such statistical graphs. The service provider computers 210 may determine, based at least in part on the API calls received from the third-party users, the appropriate data and/or graphs to provide. In some cases, upon request, the service provider computers 210 may also provide the percentile graph data, percentile graphs, and/or UIs for animating the percentile graphs to the third-party users.

Additional types of computer storage media that may be present in the service provider computers 210 may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile discs (DVD) or other optical storage, magnetic cassettes, magnetic tape, magnetic disk storage or other magnetic storage devices, or any other medium which can be used to store the desired information and which can be accessed by the service provider computers 210. Combinations of any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

A few additional examples of the operations of the service provider computers 210 are also described in greater detail below with reference to at least FIGS. 3-8.

Figure 3:
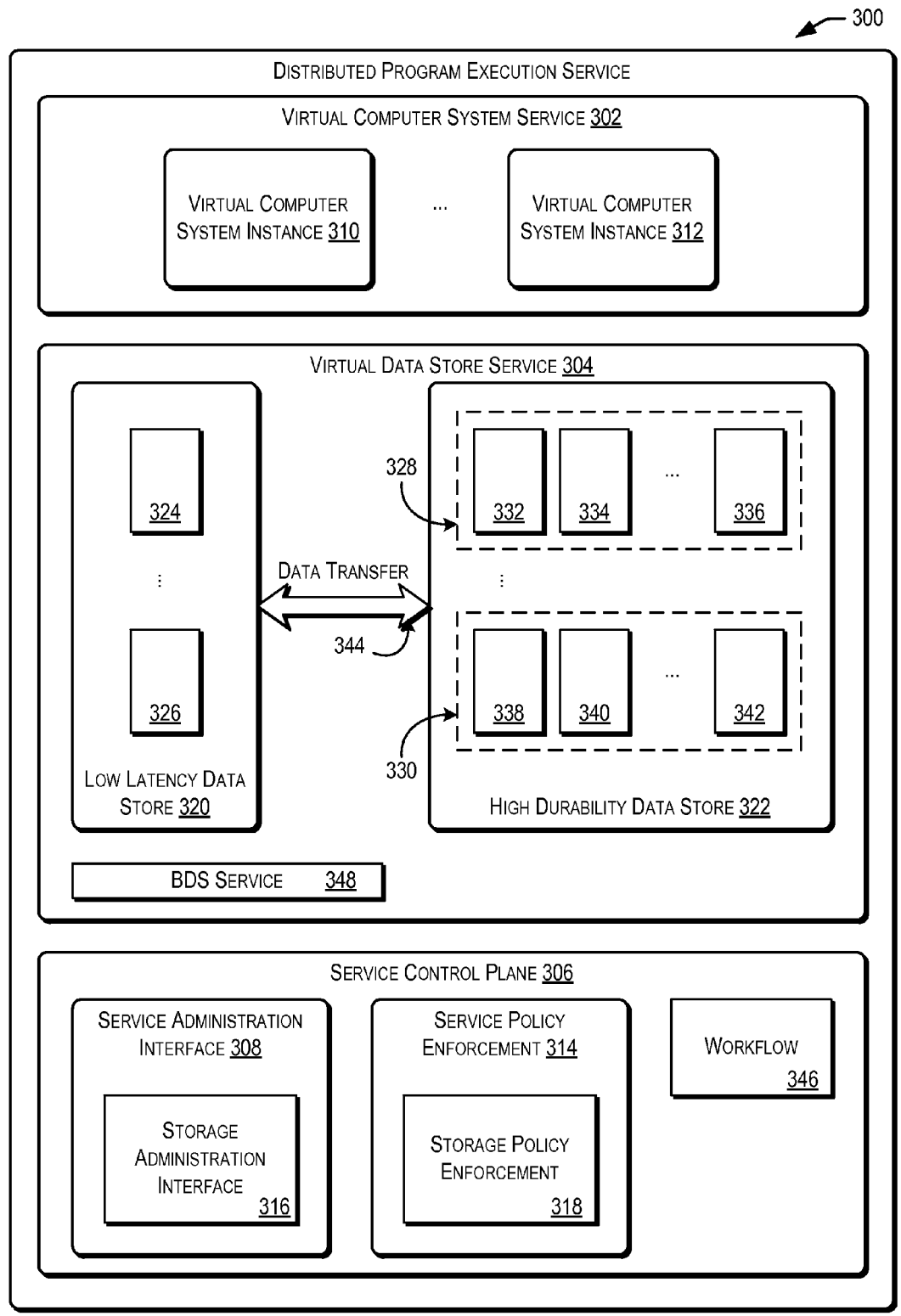
FIG. 3 illustrates an example architecture of a distributed program execution service that may be utilized to implement and/or may be implemented in conjunction with the automated statistical graphing tools described herein, according to at least one example.

As noted, in at least one example, one or more aspects of the environment or architecture 200 may incorporate and/or be incorporated into a distributed computing system or distributed program execution service such as that hosted by the service provider computers 210. FIG. 3 depicts aspects of an example distributed program execution service 300 in accordance with at least one example. The distributed program execution service 300 may provide virtualized computing services, including a virtual computer system service 302 and a virtual data store service 304, with a wide variety of computing resources interlinked by a relatively high speed data network. Such computing resources may include processors such as central processing units (CPUs), volatile storage devices such as RAM, nonvolatile storage devices such as flash memory, hard drives and optical drives, servers such as the service provider computers 210 described above with reference to FIG. 2, one or more data stores such as the data set 248 of FIG. 2, as well as communication bandwidth in the interlinking network. The computing resources managed by the distributed program execution service 300 are not shown explicitly in FIG. 3 because it is an aspect of the distributed program execution service 300 to emphasize an independence of the virtualized computing services from the computing resources that implement them.

The distributed program execution service 300 may utilize the computing resources to implement the virtualized computing services at least in part by executing one or more programs, program modules, program components, and/or programmatic objects (collectively, "program components") including and/or compiled from instructions and/or code specified with any suitable machine and/or programming language. For example, the computing resources may be allocated, and reallocated as necessary, to facilitate execution of the program components, and/or the program components may be assigned, and reassigned as necessary, to the computing resources. Such assignment may include physical relocation of program components, for example, to enhance execution efficiency. From a perspective of a user of the virtualized computing services, the distributed program execution service 300 may supply computing resources elastically and/or on-demand, for example, associated with a per resource unit commodity-style pricing plan.

The distributed program execution service 300 may further utilize the computing resources to implement a service control plane 306 configured at least to control the virtualized computing services. The service control plane 306 may include a service administration interface 308. The service administration interface 308 may include a web-based user interface configured at least to enable users and/or administrators of the virtualized computing services to provision, de-provision, configure, and/or reconfigure (collectively, "provision") suitable aspects of the virtualized computing services. For example, a user of the virtual computer system service 302 may provision one or more virtual computer system instances 310, 312. The user may then configure the provisioned virtual computer system instances 310, 312 to execute the user's application programs. The ellipsis between the virtual computer system instances 310 and 312 (as well as with other ellipses throughout this disclosure) indicates that the virtual computer system service 302 may support any suitable number (e.g., thousands, millions, and more) of virtual computer system instances although, for clarity, only two are shown.

The service administration interface 308 may further enable users and/or administrators to specify and/or re-specify virtualized computing service policies. Such policies may be maintained and enforced by a service policy enforcement component 314 of the service control plane 306. For example, a storage administration interface 316 portion of the service administration interface 308 may be utilized by users and/or administrators of the virtual data store service 304 to specify virtual data store service policies to be maintained and enforced by a storage policy enforcement component 318 of the service policy enforcement component 314. Various aspects and/or facilities of the virtual computer system service 302 and the virtual data store service 304 including the virtual computer system instances 310, 312, the low latency data store 320 (similar to the low-latency memory 220 of FIG. 2), the high durability data store 322 (similar to the memory 218 of FIG. 2), and/or the underlying computing resources may be controlled with interfaces such as application programming interfaces (APIs) and/or web-based service interfaces. In at least one example, the control plane 306 further includes a workflow component 346 configured at least to interact with and/or guide interaction with the interfaces of the various aspects and/or facilities of the virtual computer system service 302 and the virtual data store service 304 in accordance with one or more workflows.

In at least one embodiment, service administration interface 308 and/or the service policy enforcement component 314 may create, and/or cause the workflow component 346 to create, one or more workflows that are then maintained by the workflow component 346. Workflows, such as provisioning workflows and policy enforcement workflows, may include one or more sequences of tasks to be executed to perform a job, such as provisioning or policy enforcement. A workflow, as the term is used herein, is not the tasks themselves, but a task control structure that may control flow of information to and from tasks, as well as the order of execution of the tasks it controls. For example, a workflow may be considered a state machine that can manage and return the state of a process at any time during execution. Workflows may be created from workflow templates. For example, a provisioning workflow may be created from a provisioning workflow template configured with parameters by the service administration interface 308. As another example, a policy enforcement workflow may be created from a policy enforcement workflow template configured with parameters by the service policy enforcement component 314.

The workflow component 346 may modify, further specify, and/or further configure established workflows. For example, the workflow component 346 may select particular computing resources of the distributed program execution service 300 to execute and/or be assigned to particular tasks. Such selection may be based at least in part on the computing resource needs of the particular task as assessed by the workflow component 346. As another example, the workflow component 346 may add additional and/or duplicate tasks to an established workflow and/or reconfigure information flow between tasks in the established workflow. Such modification of established workflows may be based at least in part on an execution efficiency analysis by the workflow component 346. For example, some tasks may be efficiently performed in parallel, while other tasks depend on the successful completion of previous tasks.

The virtual data store service 304 may include multiple types of virtual data stores such as a low latency data store 320 and a high durability data store 322. For example, the low latency data store 320 may maintain one or more data sets 324, 326 which may be read and/or written (collectively, "accessed") by the virtual computer system instances 310, 312 with relatively low latency. The ellipsis between the data sets 324 and 326 indicates that the low latency data store 320 may support any suitable number (e.g., thousands, millions, and more) of data sets although, for clarity, only two are shown. For each data set 324, 326 maintained by the low latency data store 320, the high durability data store 322 may maintain a set of captures 328, 330. Each set of captures 328, 330 may maintain any suitable number of captures 332, 334, 336 and 338, 340, 342 of its associated data set 324, 326, respectively, as indicated by the ellipses. Each capture 332, 334, 336 and 338, 340, 342 may provide a representation of the respective data set 324 and 326 at particular moment in time. Such captures 332, 334, 336 and 338, 340, 342 may be utilized for later inspection including restoration of the respective data set 324 and 326 to its state at the captured moment in time. Although each component of the distributed program execution service 300 may communicate utilizing the underlying network, data transfer 344 between the low latency data store 320 and the high durability data store 322 is highlighted in FIG. 2 because the contribution to utilization load on the underlying network by such data transfer 344 can be significant.

For example, the data sets 324, 326 of the low latency data store 320 may be virtual disk files (i.e., file(s) that can contain sequences of bytes that represent disk partitions and file systems) or other logical volumes. The low latency data store 320 may include a low overhead virtualization layer providing access to underlying data storage hardware. For example, the virtualization layer of the low latency data store 320 may be low overhead relative to an equivalent layer of the high durability data store 322. Systems and methods for establishing and maintaining low latency data stores and high durability data stores in accordance with at least one embodiment are known to those of skill in the art, so only some of their features are highlighted herein. In at least one embodiment, the sets of underlying computing resources allocated to the low latency data store 320 and the high durability data store 322, respectively, are substantially disjoint. In a specific embodiment, the low latency data store 320 could be a Storage Area Network (SAN) target or the like. In this exemplary embodiment, the physical computer system that hosts the virtual computer system instance 310, 312 can send read/write requests to the SAN target.

The low latency data store 320 and/or the high durability data store 322 may be considered non-local and/or independent with respect to the virtual computer system instances 310, 312. For example, physical servers implementing the virtual computer system service 302 may include local storage facilities such as hard drives. Such local storage facilities may be relatively low latency but limited in other ways, for example, with respect to reliability, durability, size, throughput, and/or availability. Furthermore, data in local storage allocated to particular virtual computer system instances 310, 312 may have a validity lifetime corresponding to the virtual computer system instance 310, 312, so that if the virtual computer system instance 310, 312 fails or is de-provisioned, the local data is lost and/or becomes invalid. In at least one embodiment, data sets 324, 326 in non-local storage may be efficiently shared by multiple virtual computer system instances 310, 312. For example, the data sets 324, 326 may be mounted by the virtual computer system instances 310, 312 as virtual storage volumes.

Data stores in the virtual data store service 304, including the low latency data store 320 and/or the high durability data store 322, may be facilitated by and/or implemented with a block data storage (BDS) service 348, at least in part. The BDS service 348 may facilitate the creation, reading, updating, and/or deletion of one or more block data storage volumes, such as virtual storage volumes, with a set of allocated computing resources including multiple block data storage servers. A block data storage volume, and/or the data blocks thereof, may be distributed and/or replicated across multiple block data storage servers to enhance volume reliability, latency, durability, and/or availability. As one example, the multiple server block data storage systems that store block data may in some embodiments be organized into one or more pools or other groups that each have multiple physical server storage systems co-located at a geographical location, such as in each of one or more geographically distributed data centers, and the program(s) that use a block data volume stored on a server block data storage system in a data center may execute on one or more other physical computing systems at that data center.

The BDS service 348 may facilitate and/or implement local caching of data blocks as they are transferred through the underlying computing resources of the distributed program execution service 300 including local caching at data store servers implementing the low latency data store 320 and/or the high durability data store 322, and local caching at virtual computer system servers implementing the virtual computer system service 302. In at least one embodiment, the high durability data store 322 is an archive quality data store implemented independent of the BDS service 348. The high durability data store 322 may work with sets of data that are large relative to the data blocks manipulated by the BDS service 348. The high durability data store 322 may be implemented independent of the BDS service 348. For example, with distinct interfaces, protocols, and/or storage formats.

Each data set 324, 326 may have a distinct pattern of change over time. For example, the data set 324 may have a higher rate of change than the data set 326. However, in at least one embodiment, bulk average rates of change insufficiently characterize data set change. For example, the rate of change of the data set 324, 326 may itself have a pattern that varies with respect to time of day, day of week, seasonally including expected bursts correlated with holidays and/or special events, and/or annually. Different portions of the data set 324, 326 may be associated with different rates of change, and each rate of change "signal" may itself be composed of independent signal sources, for example, detectable with Fourier analysis techniques. Any suitable statistical analysis techniques may be utilized to model data set change patterns including Markov modeling and Bayesian modeling.

As described above, an initial capture 332 of the data set 324 may involve a substantially full copy of the data set 324 and transfer 344 through the network to the high durability data store 322 (may be a "full capture"). In a specific example, this may include taking a snapshot of the blocks that make up a virtual storage volume. Data transferred between the low latency data store 320 and high durability data store 322 may be orchestrated by one or more processes of the BDS service 348. As another example, a virtual disk (storage volume) may be transferred to a physical computer hosting a virtual computer system instance 310. A hypervisor may generate a write log that describes the data and location where the virtual computer system instance 310 writes the data. The write log may then be stored by the high durability data store 322 along with an image of the virtual disk when it was sent to the physical computer.

The data set 324 may be associated with various kinds of metadata. Some, none, or all of such metadata may be included in a capture 332, 334, 336 of the data set 324 depending on the type of the data set 324. For example, the low latency data store 320 may specify metadata to be included in a capture depending on its cost of reconstruction in a failure recovery scenario. Captures 334, 336 beyond the initial capture 332 may be "incremental," for example, involving a copy of changes to the data set 324 since one or more previous captures. Changes to a data set may also be recorded by a group of differencing virtual disks which each comprise a set of data blocks. Each differencing virtual disk may be a parent and/or child differencing disk. A child differencing disk may contain data blocks that are changed relative to a parent differencing disk. Captures 332, 334, 336 may be arranged in a hierarchy of classes, so that a particular capture may be incremental with respect to a sub-hierarchy of capture classes (e.g., a capture scheduled weekly may be redundant with respect to daily captures of the past week, but incremental with respect to the previous weekly capture). Depending on the frequency of subsequent captures 334, 336, utilization load on the underlying computing resources can be significantly less for incremental captures compared to full captures.

For example, a capture 332, 334, 336 of the data set 324 may include read access of a set of servers and/or storage devices implementing the low latency data store 320, as well as write access to update metadata, for example, to update a data structure tracking "dirty" data blocks of the data set 324. For the purposes of this description, data blocks of the data set 324 are dirty (with respect to a particular class and/or type of capture) if they have been changed since the most recent capture (of the same class and/or type). Prior to being transferred 344 from the low latency data store 320 to the high durability data store 322, capture 332, 334, 336 data may be compressed and/or encrypted by the set of servers. At the high durability data store 322, received capture 332, 334, 336 data may again be written to an underlying set of servers and/or storage devices. Thus each capture 332, 334, 336 involves a load on finite underlying computing resources including server load and network load. It should be noted that, while illustrative embodiments of the present disclosure discuss storage of captures in the high durability data store 322, captures may be stored in numerous ways. Captures may be stored in any data store capable of storing captures including, but not limited to, low-latency data stores and the same data stores that store the data being captured.

Captures 332, 334, 336 of the data set 324 may be manually requested, for example, utilizing the storage administration interface 316. In at least one embodiment, the captures 332, 334, 336 may be automatically scheduled in accordance with a data set capture policy. Data set capture policies in accordance with at least one embodiment may be specified with the storage administration interface 316, as well as associated with one or more particular data sets 324, 326. The data set capture policy may specify a fixed or flexible schedule for data set capture. Fixed data set capture schedules may specify captures at particular times of day, days of the week, months of the year, and/or any suitable time and date. Fixed data set capture schedules may include recurring captures (e.g., every weekday at midnight, every Friday at 2 am, 4 am every first of the month) as well as one-off captures.

Figure 4:
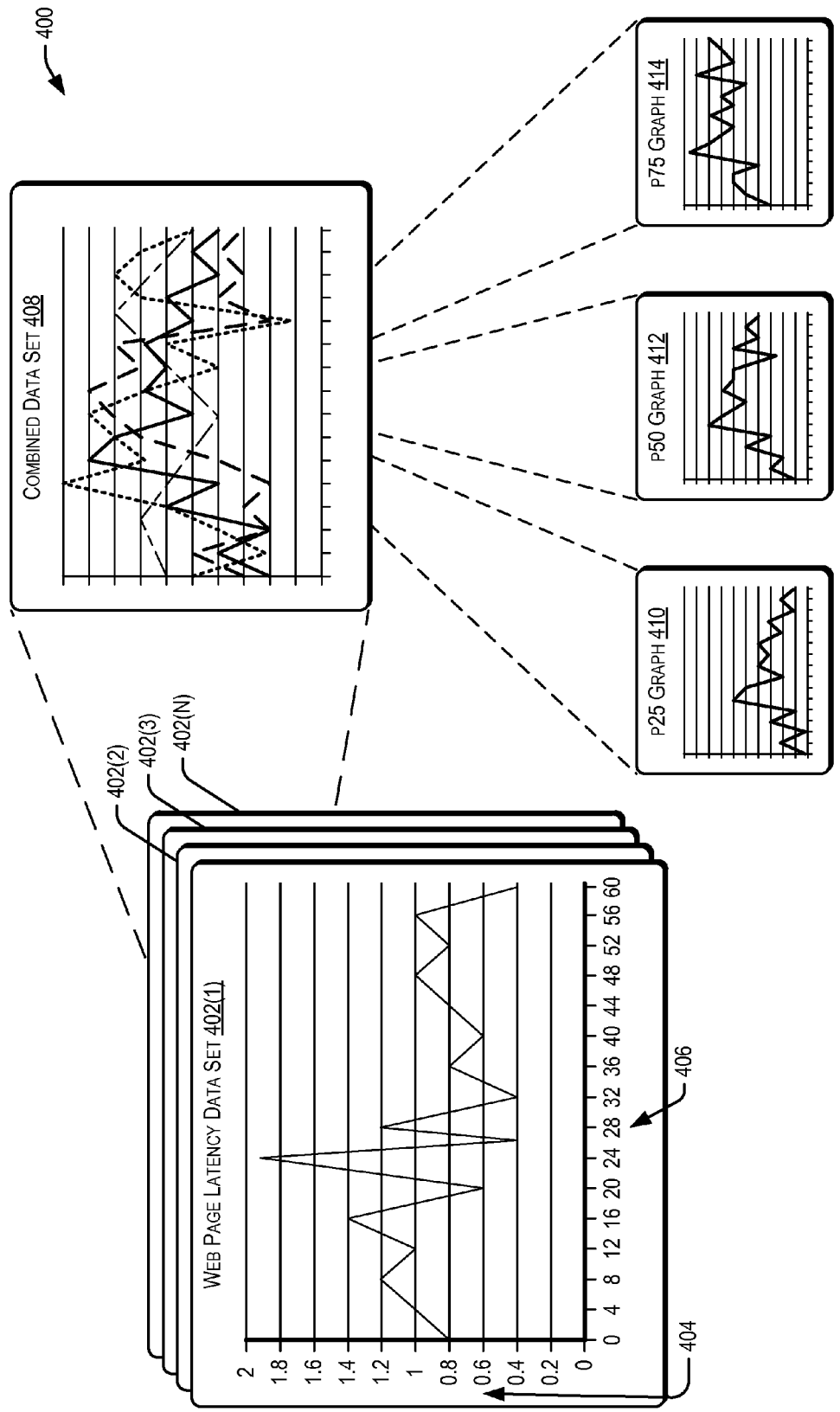
FIG. 4 illustrates example percentile graphs for display within user interfaces for implementing the automated statistical graphing tools described herein, according to at least one example.

FIG. 4 depicts example charts 400 for representing one or more example percentile graphs or other graphical representations of the percentiles (or other statistical measurements) calculated by the service provider computers 210 of FIG. 2. While illustrated in FIG. 4 as line charts 400, any type of chart, graph, or other statistical representation (e.g., a histograms, pie charts, etc.) may be envisioned, as desired. In one non-limiting example, web page latency data may be collected for a particular web page (or at least for page data associated with an identifier) over a period of time for one or more users. For example, the charts 402(1)-(N) (collectively, "charts 402") may each represent data collected for latency associated with individual users (or user computers). That is, chart 402(1) may correspond to latency data for a first user (during a particular period of time), while chart 402(2) may correspond to latency data for a second user (during the same particular period of time). In some examples, the y-axis 404 may indicate latency for accessing a web page in seconds, milliseconds, or the like, and the x-axis 406 may indicate time intervals during which the resource is monitored (e.g., 4 minute intervals during a particular hour, 4 second intervals during a particular minute, or the like). However, any distribution of data may be utilized (e.g., the number of items in a user's shopping cart, etc.). Additionally, while charts are shown in FIG. 4 for illustrating the collected data, this is for explanatory purposes only, as the data may not be represented in a graph or chart at all, or at least not until the service provider computers 210 and/or the user devices 204 of FIG. 2 convert the data to charts.

In some examples, each of the sets of data associated with the example charts 402 may be combined into a single data set with multiple data points for each interval. As such, the graph of the combined data set 408 is illustrative of a line chart representing the data sets made by combining each of the individual web page latency data sets 402. Again, the graph of the combined data set 408 chart is for illustrative purposes only, as the data may not actually be represented as a chart at this stage. Additionally, in some aspects, one or more percentiles may be calculated utilizing the graph of the combined data set 408. For example, for each interval (i.e., each x-axis tick on the graph 408), a percentile may be calculated (e.g., p10, p20, p25, p50, p99, etc.) as appropriate. As shown in FIG. 4, a p25 graph 410, a p50 graph 412, and/or a p75 graph 414 may be generated. However, as noted above, the percentile data may be calculated without the graphs 410, 412, 414 being generated. As shown in FIG. 4, the p25 graph 410 may illustrate the latency recorded for the bottom 25% of users at each interval. In this way, the data points at each interval may represent different users; however, it will always indicate the latency recorded in the $25^{th}$ percentile of recorded latencies for that interval. Similarly, the p50 graph 412 illustrates the latency recorded for 50% of users at each interval and the p75 graph 414 illustrates the latency recorded for the top 25% of users at each interval. As such, a user viewing these three graphs 410, 412, 414 will notice that the lines always increase as the percentile number increases. However, the rate at which each data point increase will not likely be constant. As such, anomalies may be identifiable by viewing each graph 410, 412, 414 consecutively (each for a particular amount of time). For example, a UI may be provided to the user that animates the graphs 410, 412, 414 by illustrating one after the other or by illustrating them transposed over each other for periods of time. Similarly, "top N" or other statistical data may be represented in similar ways.

Additionally, in some examples, graphs 410, 412, 414 may be compared against similar graphs calculated for different points in time. For example, the p75 graph 414 may be compared with a p75 graph from some other timeframe (e.g., the previous day, week, year, etc.). In this way, incremental changes in the data may be compared with other incremental changes to detect operational issues or other anomalies. In some examples, operational issues (e.g., degradation, spikes, etc.) may be detected automatically by comparing graphs of a same timeframe and/or graphs from different time frames. For example, a certain percentage change above a threshold may indicate anomalous data. In one non-limiting example, for a particular interval, data may increase roughly 10% from one percentile to the next. However, from p70 to p80, the data may increase by 25%; this may indicate an operational issue.

Additionally, and as briefly discussed above, in some examples the graphs 410, 412, 414 may be utilized to automatically identify anomalous data and/or operational issues. As such, the percentile graphs 410, 412, 414 that indicate the anomalous data and/or operational issues may be further analyzed to identify the actual operational issue. Based at least in part on this determination, automatic actions may be performed to remediate the operational issue. Additionally, notifications may be provided to users indicating the identified operational issue and/or remediation recommendations may be provided. Additionally, indications of accuracy may be provided with any set of percentile data (e.g., based at least in part on percentile comparisons, data set size, etc.). For example, if there are only 10 data points at each interval, a p99 graph will not likely be accurate for each percentile. Further, in some examples, the determination of which percentile graphs to provide to the users may be based at least in part on this information. Understats and/or overstats may also be provided. Further, the percentile graphs may be sorted automatically and/or based at least in part on configuration settings provided by the users.

Figure 5:
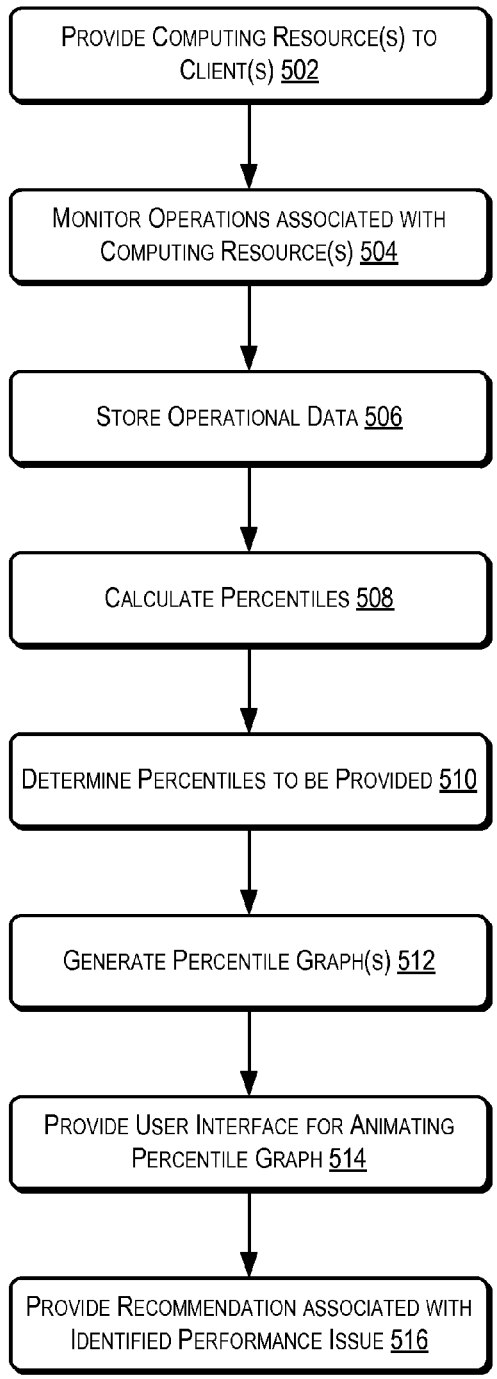
FIG. 5 illustrates an example flow diagram of a process for implementing the automated statistical graphing tools described herein, according to at least one example.
Figure 6:
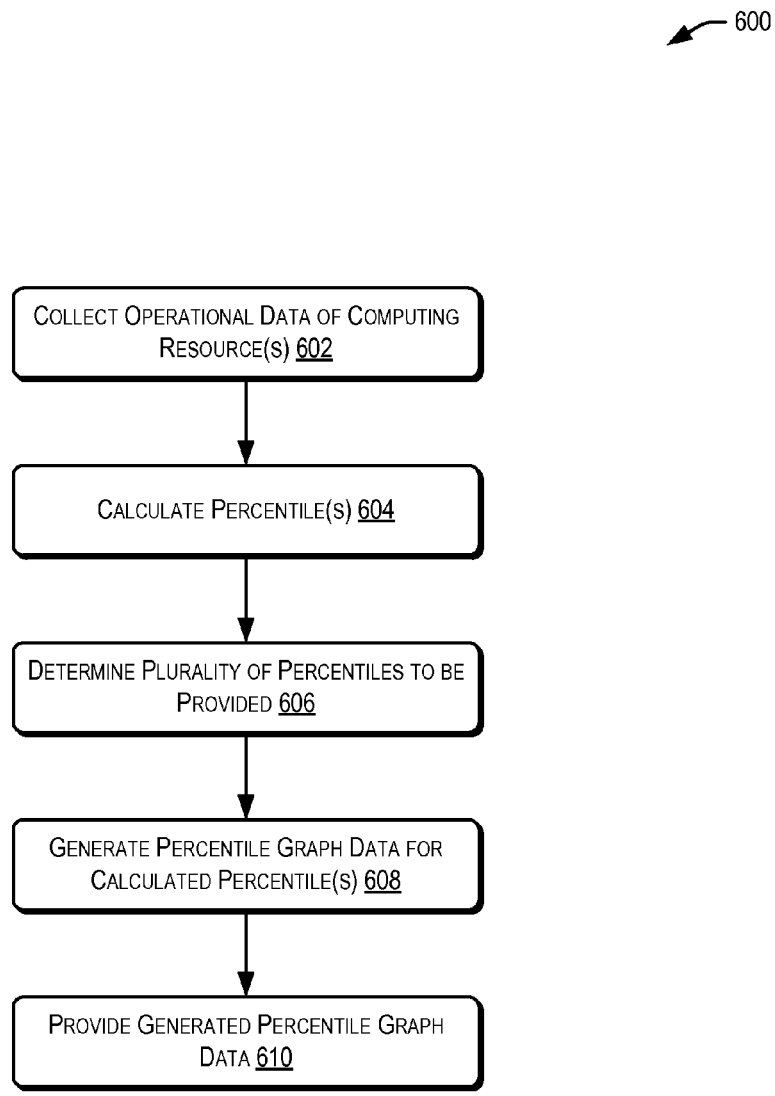
FIG. 6 illustrates another example flow diagram of a process for implementing the automated statistical graphing tools described herein, according to at least one example.
Figure 7:
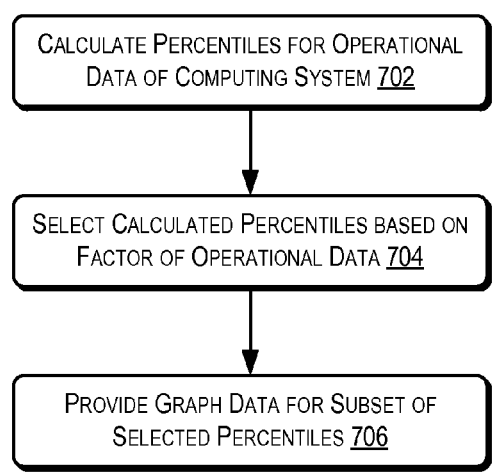
FIG. 7 illustrates another example flow diagram of a process for implementing the automated statistical graphing tools described herein, according to at least one example.

FIGS. 5-7 illustrate example flow diagrams showing respective processes 500-700 for managing statistical data associated with distributed resources and/or services. These processes are illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures and the like that perform particular functions or implement particular data types. The order in which the operations are described is not intended to be construed as a limitation, and any number of the described operations can be combined in any order and/or in parallel to implement the processes.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium may be non-transitory.

In some examples, the one or more service provider computers 210 (e.g., utilizing at least one of the monitoring module 242, the statistical calculation module 236, and/or the graphing module 240) shown in FIG. 2 may perform the process 500 of FIG. 5. The process 500 may begin by including providing computing resources to one or more clients at 502. In some aspects the computing resources may include processors, storage devices, cloud computing services, or the like. Additionally, the clients may include users accessing the computing resources and/or machine instances programmatically operated by the users. At 504, the process 500 may include monitoring operations associated with the computing resources. For example, the operations may include storing data, service web page content, etc. The process 500 may also include storing operational data associated with the monitored operations at 506. For example, if web page operations are being monitored, the process 500 may include storing latency, load time, and/or other operational data associated with the web page operations.

In some examples, the process 500 may include calculating percentiles at 508. In some examples, any number of randomly (or pseudo-randomly) generated percentiles may be calculated. However, in other examples a particular set of percentiles may be calculated. The particular set or the size of the particular set may, in some examples, be based at least in part on the size of the data set or other factors of the data set. At 510, the process 500 may include determining one or more percentiles (e.g., of the calculated percentiles) to be provided. In some examples, the determination is based at least in part on the data set size or other factors of the data set (e.g., anomalous data identified within the data set, known operational issues, etc.). The process 500 may also include generating percentile graphs at 512. In some aspects, determining which calculated percentiles to be generated into percentile graphs at 512 may be based at least in part on user settings and/or data set information. However, in other examples, each percentile determined to be provided at 510 may be graphed at 512. At 514, the process 500 may include providing a UI for animating the generated percentile graphs. As such, the UI may be configured to provide the generated percentile graphs in any known manner, but at least similar to the methods described above. The process 500 may end at 516, where the process 500 may include providing a recommendation associated with an identified operational issue. Additionally, as discussed above, automatic remediation may be implemented to correct the operational issue and/or issue notifications may be provided.

FIG. 6 illustrates an example flow diagram showing process 600 for managing statistical data associated with distributed resources and/or services. The one or more service provider computers 210 (e.g., utilizing at least one of the monitoring module 242, the statistical calculation module 236, and/or the graphing module 240) shown in FIG. 2 may perform the process 600 of FIG. 6. The process 600 may begin by including collection of operational data of one or more computing resources and/or services at 602. At 604, the process 600 may include automatically calculating percentiles for the collected operational data. For example, one or more preset percentiles may be calculated for the collected operational data and/or the number of percentiles (and/or actual percentile) to be calculated may be determined based at least in part on information (e.g., metadata) associated with the data set. In some examples, the process 600 may include determining a plurality of percentiles to be provided at 606. As noted above, this determination may be based at least in part on user settings and/or the sample size of the data set. Additionally, in some examples, upon reviewing a set of percentile graphs a user may identify an additional set of percentiles that they wish to review. As such, the determination at 606 may be based at least in part on a request from the user to have additional percentile graphs provided. At 608, the process 600 may include generating percentile graph data for the calculated percentiles (e.g., based at least in part on the determination made at 606). For example, the percentile graph data may include the graph itself or it may only include data that may be utilized to generate a graph (e.g., by a user device). The process 600 may end at 610, where the process 600 may include providing the generated percentile graph data. In some examples, the percentile graph data may be provided to a user device or other computing device for processing.

FIG. 7 illustrates an example flow diagram showing process 700 for managing statistical data associated with distributed resources and/or services. The one or more service provider computers 210 (e.g., utilizing at least one of the monitoring module 242, the statistical calculation module 236, and/or the graphing module 240) shown in FIG. 2 may perform the process 700 of FIG. 7. The process 700 may begin by including a calculation of percentiles for operational data of a computing system at 702. The computing system may be a distributed, network-based environment configured to provide web services, cloud services, etc., to users. At 704, the process 700 may include selecting calculated percentiles based at least in part on a factor of the operational data. In some cases, the factor (e.g., dataset size) may indicate the number of percentiles to calculate and/or the number of calculated percentiles to select. The process 700 may end at 706, where the process 700 may include providing graph data for at least a subset of the selected percentiles.

Illustrative methods and systems for managing metadata and/or tags associated with browsing history information are described above. Some or all of these systems and methods may, but need not, be implemented at least partially by architectures such as those shown at least in FIGS. 2-8 above.

Figure 8:
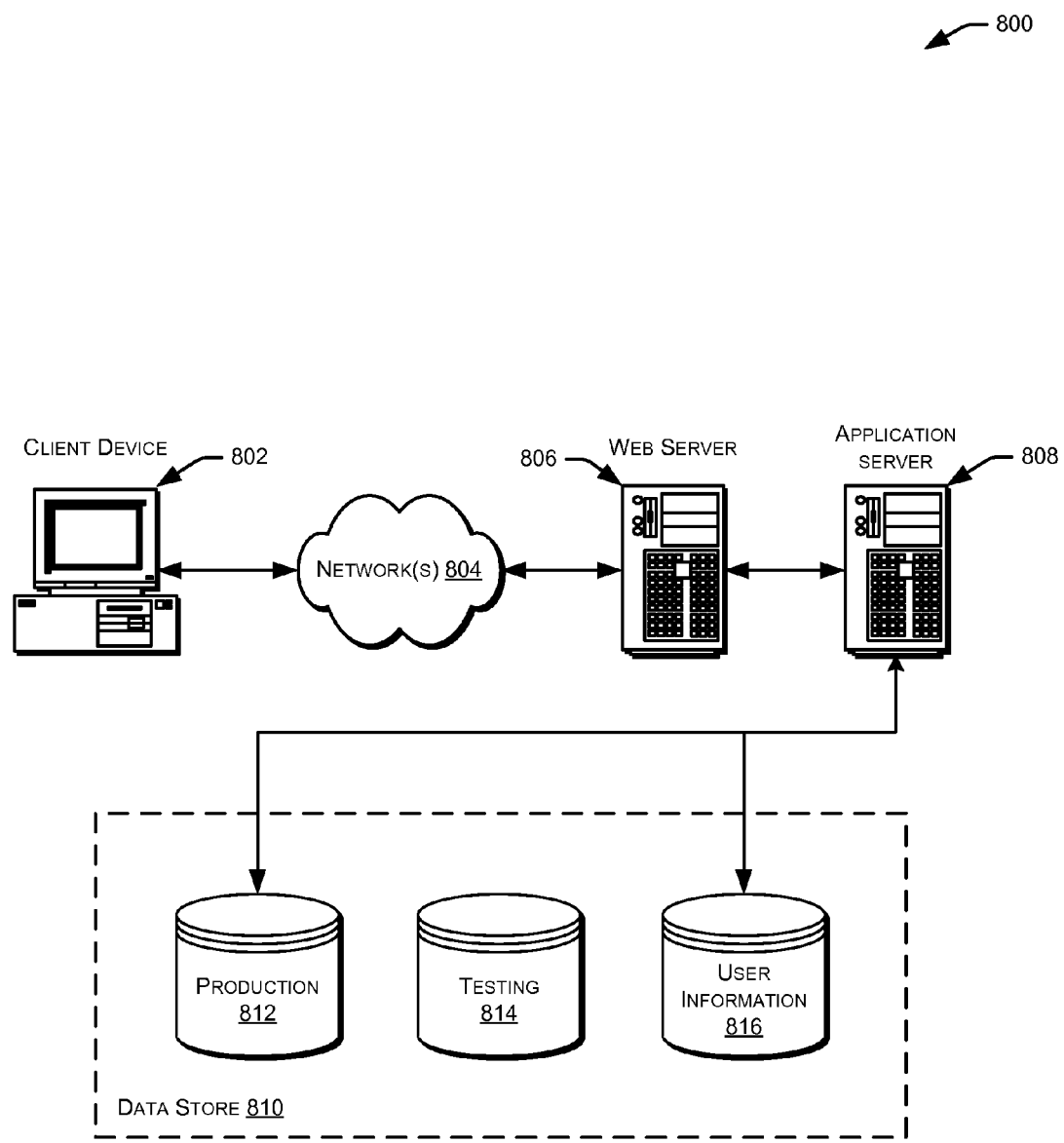
FIG. 8 illustrates an environment in which various embodiments of the automated statistical graphing tools described herein can be implemented, according to at least one example.

FIG. 8 illustrates aspects of an example environment 800 for implementing aspects in accordance with various embodiments. As will be appreciated, although a Web-based environment is used for purposes of explanation, different environments may be used, as appropriate, to implement various embodiments. The environment includes an electronic client device 802, which can include any appropriate device operable to send and receive requests, messages, or information over an appropriate network 804 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing, and/or retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 802 and the application server 808, can be handled by the Web server. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing production data 812 and user information 816, which can be used to serve content for the production side. The data store also is shown to include a mechanism for storing log data 814, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device 802. Information for a particular item of interest can be viewed in a dedicated page or window of the browser.

Each server typically will include an operating system that provides executable program instructions for the general administration and operation of that server, and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature, and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen or keypad), and at least one output device (e.g., a display device, printer or speaker). Such a system may also include one or more storage devices, such as disk drives, optical storage devices, and solid-state storage devices such as RAM or ROM, as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, DVD or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method for managing distributed computing statistics, comprising:
    providing, by one or more computer systems, one or more computing services to one or more clients;
    monitoring resource operations associated with the provided one or more computing services;
    storing operational data associated with the monitored resource operations;
    calculating a plurality of percentiles based at least in part on a distribution of the stored operational data, the plurality of percentiles representing operational data associated with a percentage of the one or more clients;
    determining a percentile of the plurality of percentiles to be provided based at least in part on anomalous data detected between the percentile and other percentiles of the plurality of percentiles;
    generating a percentile graph for the determined percentile; and
    providing, to at least a first client of the one or more clients, a user interface for animating the generated percentile graph with other percentile graphs generated based at least in part on the other percentiles of the plurality of percentiles.

2. The computer-implemented method of claim 1, wherein the computing services include at least web hosting, web serving, data storage, or data processing.

3. The computer-implemented method of claim 1, wherein the percentile graph is generated based at least in part on an operational issue of the one or more computing services identified by analyzing the plurality of percentiles.

4. The computer-implemented method of claim 3, further comprising providing a recommendation associated with the operational issue.

5. The computer-implemented method of claim 1, wherein the animating includes at least providing data from each of the plurality of generated percentiles.

6. The computer-implemented method of claim 5, wherein the animating further includes at least providing data from each of the plurality of generated percentiles consecutively or concurrently.

7. The computer-implemented method of claim 5, wherein the amount of time is based at least in part on a configuration received from the first client.

8. A computer-implemented method for managing distributed computing statistics, comprising:
    collecting, by one or more computer systems, operational data associated with monitored operations of one or more computing resources;
    calculating one or more percentiles for the collected operational data, the one or more percentiles being associated with the operational data for a percentage of the computing resources;
    determining a percentile of the one or more calculated percentiles to be provided based at least in part on anomalous data detected between the percentile and other percentiles of the one or more calculated percentiles;

generating a percentile graph for the determined percentile; and providing the generated percentile graph for presentation.

9. The computer-implemented method of claim 8, wherein the operations of the one or more computing resources include at least providing data over a network at least in response to a request for the data.

10. The computer-implemented method of claim 9, wherein providing data over the network includes providing web page data associated with a web page identifier.

11. The computer-implemented method of claim 8, wherein the operational data indicates a latency associated with the monitored operations of the one or more computing resources.

12. The computer-implemented method of claim 8, wherein determining the percentile of the one or more calculated percentiles to be provided is further based at least in part on identification of an operational issue of the computing system.

13. The computer-implemented method of claim 12, wherein the operational issue is indicated by at least a difference between a first calculated percentile and a second calculated percentile.

14. A system for managing distributed computing statistics, comprising:
    at least one memory that stores computer-executable instructions; and
    at least one processor configured to access the at least one memory, wherein the at least one processor is configured to execute the computer-executable instructions to collectively at least:
        generate percentile graph data for at least a subset of monitored operation metrics of a computing resource;
        identify anomalous data of the operation metrics based at least in part on at least one difference identified between different percentiles associated with the generated percentile graph data; and
        provide the identified anomalous data and the generated percentile graph data associated with the identified anomalous data.

15. The system of claim 14, wherein the operation metrics of the computing resource include at least a load time associated with a user and the computing resource.

16. The system of claim 15, wherein the computing resource includes at least a machine instance configured to cause data to be provided to the user.

17. The system of claim 15, wherein the computing resource includes at least a web page accessible by the user.

18. The system of claim 14, wherein the anomalous data is identified by analyzing a first amount of the generated percentile graph data with respect to at least a second amount of the generated percentile graph data.

19. The system of claim 14, wherein the at least one processor is further configured to execute the computer-executable instructions to collectively at least provide a recommendation associated with the identified anomalous data.

20. One or more non-transitory computer-readable media storing computer-executable instructions for managing distributed computing statistics that, when executed by one or more computer systems, configure the one or more computer systems to perform operations comprising:
    calculating one or more percentiles for operational data of a computing system;
    selecting at least one of the one or more calculated percentiles based at least in part on a factor associated with the operational data of the computing system, the factor related to a variation between individual percentiles of the one or more calculated percentiles; and
    providing graph data for at least a subset of the selected percentiles.

21. The one or more computer-readable media of claim 20, wherein the operational data is based at least in part on at least one of a process performed by the computing system, a processor of the computing system, a data center of the computing system, or a service associated with the computing system.

22. The one or more computer-readable media of claim 20, wherein the at least one of the one or more calculated percentiles are selected based at least in part on a comparison between a first percentile associated with a first point in time and a second percentile associated with a second point in time.

23. The one or more computer-readable media of claim 20, wherein the factor includes at least a sample size associated with the operational data of the computing system.

24. The one or more computer-readable media of claim 20, wherein the factor includes at least an anomaly identified in the operational data of the computing system, the anomaly identified by at least analyzing the one or more calculated percentiles.

25. The one or more computer-readable media of claim 20, wherein providing the graph data comprises providing a plurality of percentile graphs to a user interface as part of an animation for displaying each of the plurality of percentile graphs for an amount of time.

26. The one or more computer-readable media of claim 20, wherein the one or more computer systems are further configured to perform operations comprising:
    receiving a request for graph data associated with a user; and
    determining operational data associated with the user, wherein providing the graph data includes at least providing a percentile graph associated with the user.

27. The one or more computer-readable media of claim 26, wherein the one or more percentiles are calculated for operational data of a second computing system.

28. The one or more computer-readable media of claim 20, wherein the one or more calculated percentiles indicate an operational issue of the computing system, and wherein the one or more computer systems are further configured to perform operations comprising providing a notification to a user of the operational issue.

29. The one or more computer-readable media of claim 28, wherein the notification includes at least an animation of the provided graph data associated with the operational issue.

* * * * *